United States Patent [19]

Jona

[11] Patent Number: 4,699,605
[45] Date of Patent: Oct. 13, 1987

[54] GEARSHIFT FOR BICYCLES

[75] Inventor: Mario G. Jona, Rubano, Italy

[73] Assignee: Campagnolo S.p.A., Vicenza, Italy

[21] Appl. No.: 885,707

[22] Filed: Jul. 15, 1986

[30] Foreign Application Priority Data

Jul. 15, 1985 [IT] Italy ................................ 21574 A/85

[51] Int. Cl.⁴ ............................................. F16H 11/08
[52] U.S. Cl. ...................................................... 474/82
[58] Field of Search ...................................... 474/78–82

[56] References Cited

U.S. PATENT DOCUMENTS 4,185,510  1/1980  Juy ......................................... 474/82

4,343,613  8/1982  Leiter et al. ...................... 474/80 X

Primary Examiner—Stephen J. Novosad
Assistant Examiner—Thuy M. Bui
Attorney, Agent, or Firm—Young & Thompson

[57] ABSTRACT

In a gearshift for bicycles—of the type controlled by a driving cable and with articulated parallelogram, comprising two connecting rods which connect an upper body, pivoted to the end of the rear fork of the bicycle frame, to a lower body carrying an oscillating rocker arm guiding the transmission chain—means are provided in the form of a rod having its end linked by means of ball hinges to the lower body of the gearshift and, respectively, to a fixed point on the rear fork.

1 Claim, 2 Drawing Figures

GEARSHIFT FOR BICYCLES

BACKGROUND OF THE INVENTION

The present invention relates to a gearshift for bicycles.

As known, a gearshift for bicycles usually comprises a first element, or "upper body", pivoted on the bicycle frame and connected by means of two connecting rods to a second element, or "lower body". On the lower body is pivotally mounted a rocker arm which, by means of two wheels and a spring mechanism, performs the functions of guding and stretching the chain. The assembly comprising the upper and lower bodies and the two connecting rods forms a parallelogram mechanism which, controlled by a flexible driving cable opposed by a spring, shifts the rocker arm in a direction usually parallel to the rear wheel axis, thereby guiding the chain in correspondence of the sprocket selected each time among the sprockets of the freewheel device of said rear wheel.

The device described shows some defects in its conventional forms of construction: the motion of the wheels guiding the chain in correspondence of the sprockets—which is substantially parallel to the axis of the sprocket assembly—leads such wheels to operate at a short distance from the large sprockets and at a far longer distance from the small sprockets; the motion of the rocker arm—which is also parallel to said axis—moreover causes the chain to wind around each sprocket with very similar winding angles, with the risk of having too few teeth meshing with the small sprockets, thereby making it more difficult to recover the chain.

A solution to these problems has been seeked in the past through various systems, the ones most adopted being that of offsetting the aforementioned chain guiding wheel in respect of the rocker arm rotation axis so as to draw it close to the sprocket assembly (with the drawback, however, that its position becomes too much influenced by the diameter of the pedal crank gear), or that of inclining the oscillation axes of the connecting rod of the articulated parallelogram, so that the trajectory of the rocker arm becomes skew in respect of the rotation axis of the sprockets (with a certain advantage for what concerns the first of the cited defects, but without eliminating the second).

More recently (see European Pat. Nos. 0013136 and 0036317), it has been proposed—also with the object of reducing the aforementioned drawbacks—to introduce into the gearshift means causing rotations of said upper body in association to the oscillations of the articulated parallelogram. Nevertheless, the means so far provided for this purpose have not allowed, on one hand, to univocally define the position of the chain guiding wheel for each sprocket meshing with the chain and, on the other hand, to easily adapt the gearshift to any type of sprocket assembly, with a continuous and congruent control of the oscillations of the articulated parallelogram and of the rotations of the upper body of the gearshift.

SUMMARY OF THE INVENTION

Both these results—the importance of which is evident, for a perfect control of the gearshift, especially in competition bicycles—are obtained with the gearshift according to the present invention, which is of the type, controlled by a driving cable, wherein an upper body mounted oscillating on the end of the rear fork of the bicycle, and a lower body carrying an oscillating rocker arm guiding the transmission chain, are connected by a pair of connecting rods to form therewith an articulated parallelogram, and wherein means are provided to cause rotations of said upper body in association to the oscillations of the articulated parallelogram, and which is characterized in that said means consist of a rod, the ends of which are linked by means of ball hinges to the lower body of the gearshift and, respectively, to a fixed point on the end of said rear fork.

BRIEF DESCRIPTION OF THE DRAWINGS

The invention will now be described in further detail, by mere way of example, with reference to the accompanying drawings, which represent a preferred embodiment thereof and in which.

DESCRIPTION OF THE PREFERRED EMBODIMENT

Figure 1:
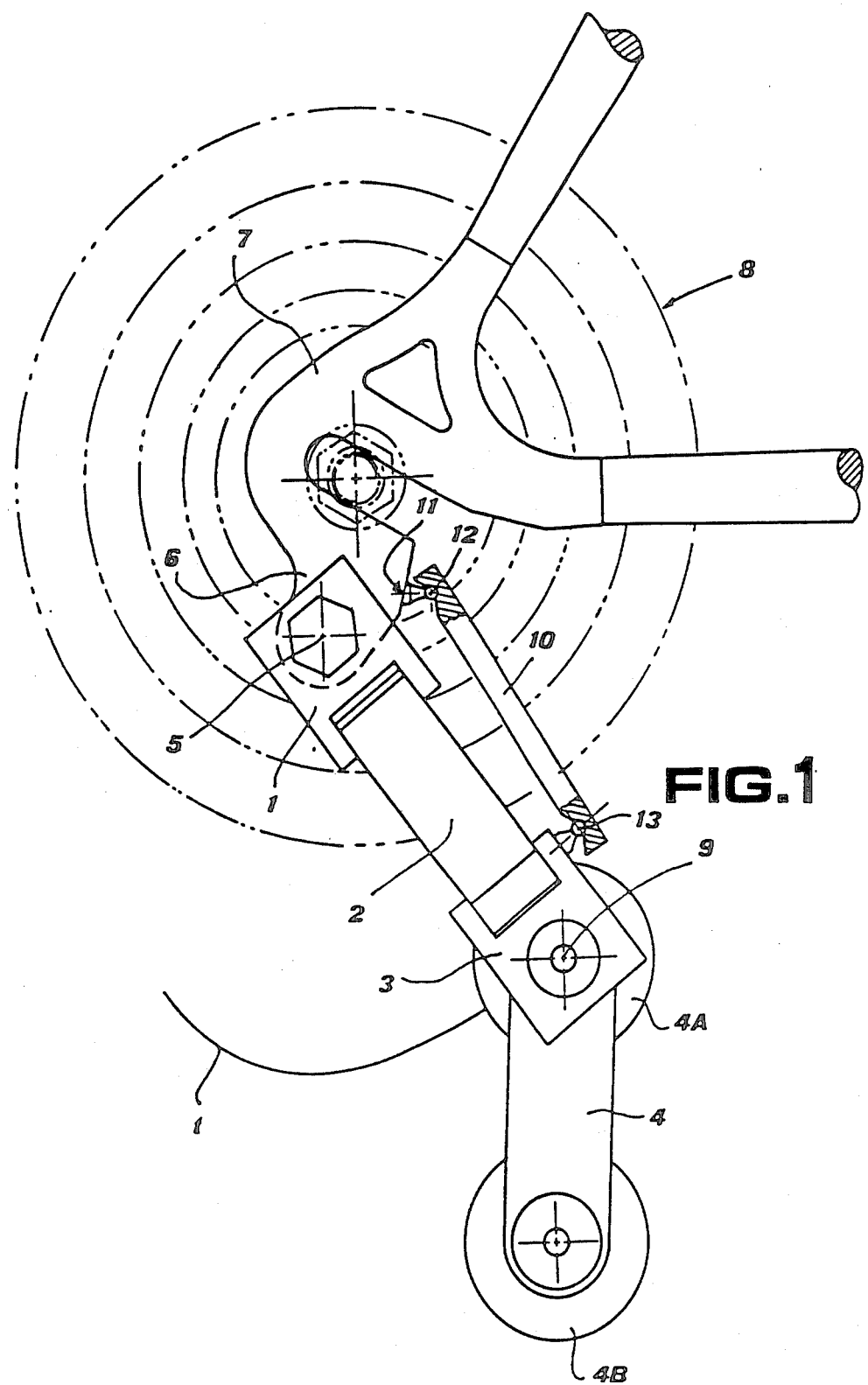
FIG. 1 is a diagrammatic lateral view of a bicycle gearshift according to the invention.

The gearshift for bicycles, according to the invention, comprises—in known manner—an upper body 1, a pair of connecting rods 2, a lower body 3 and a rocker arm 4 with rotating wheels 4A and 4B. The upper body 1 is pivotally mounted in 5 onto the eyelet end 6 of the small fork 7 forming the end of the bicycle rear fork, close to the sprocket assembly 8 operating the freewheel which drives the bicycle rear wheel. The connecting rods 2 are pivoted on the bodies 1 and 3 and are parallel one to the other, so as to form a conventional articulated parallelogram. The rocker arm 4 is mounted on the lower body 3, oscillating on a pin 9 and subject to the action of a stout return spring, and it is of the type wherein the wheel 4A guiding the chain has its rotation axis coinciding with the oscillation axis 9 of said rocker arm 4.

According to the invention, between the lower body 3 and the small fork 7 there is mounted a rod 10, the two ends of which are respectively connected to said lower body 3 and to a fixed point 11 on the small fork 7, by means of two ball hinges 12 and 13.

Said rod 10 causes a rotation about the axis 5 of the upper body 1—and thus of the whole gearshift—at each oscillation of the parallelogram 1, 2, 3, controlled by the cyclist, when this latter operates the device to change gear ratio. Any motion of the pin 9 of the rocker arm 4 (and thus of the wheel 4A—in the case (shown) wherein their axes coincide—) takes place only along the trajectory t allowed by the degree of freedom of the system. Said trajectory lies on a spheric surface, having a radius equal to the length of the rod 10 and having its centre shifted—on the plane of oscillation of the parallelogram—in respect of the ball hinge 12 connecting the rod 10 to the fixed point 11 on the small fork 7 (and thus in respect of the bicycle frame), by an extent equal to the extent by which the other ball hinge 13 is shifted—on the same plane of oscillation—in respect of the centre of the wheel 4A.

The position of the chain guiding wheel 4A is thus univocally defined for each sprocket meshing with the chain, so as to satisfy the requirements which the invention proposed to fulfil, as it allows to slightly vary both the chain length between the selected sprocket and the wheel 4A, and the number of teeth of the same sprocket meshing with the chain, when changing the working position of the gearshift and the sprockets selected for the transmission.

Figure 2:
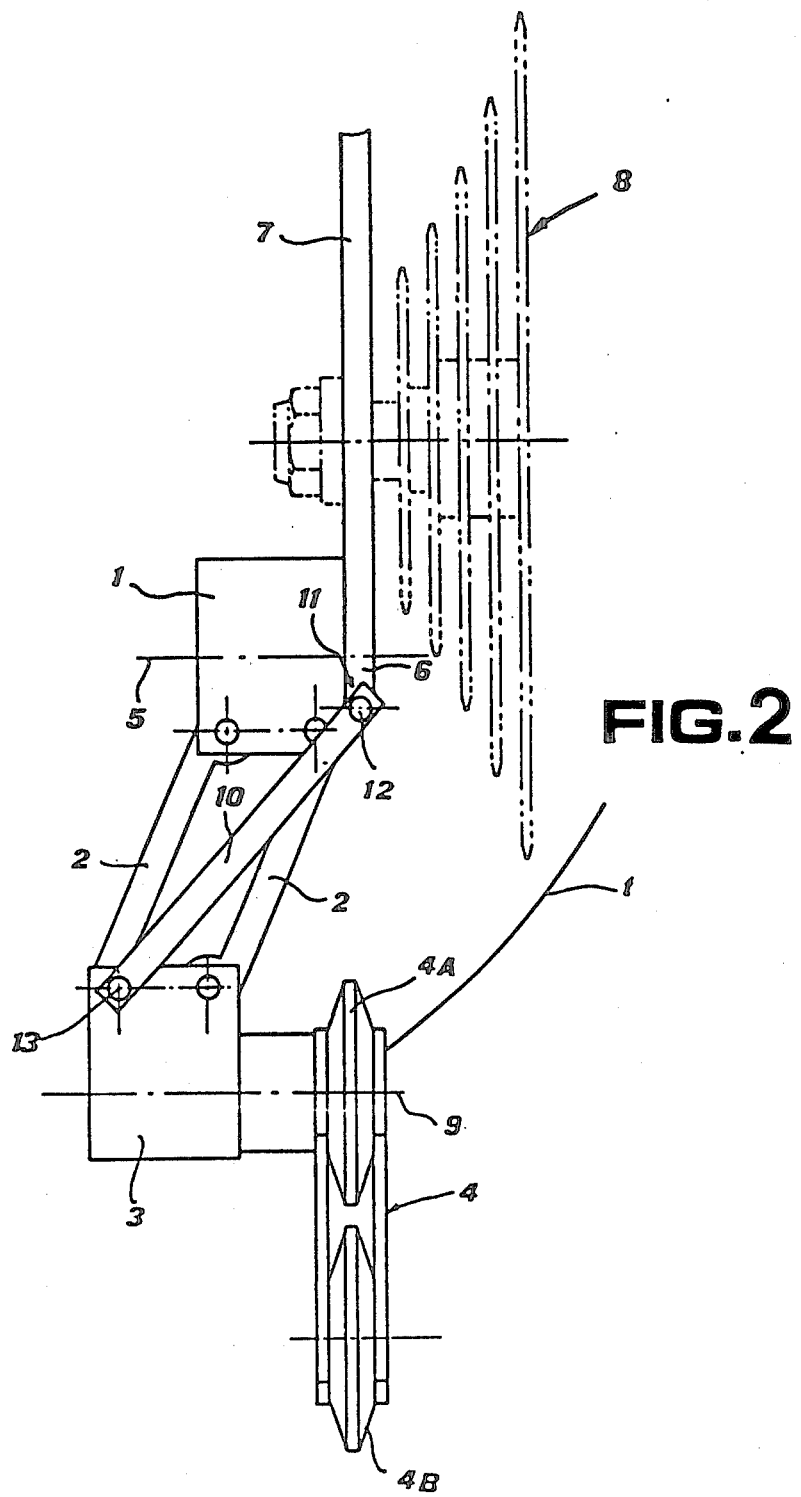
FIG. 2 is a front view of the gearshift of FIG. 1.

Said result appears evident when observing the trajectory t along which moves the chain guiding wheel 4A to take up the different positions in correspondence of the various sprockets, on the plane of oscillation of the articulated parallelogram (FIG. 2) and on the plane of rotation about the pivot 5 connecting the upper body 1 to the bicycle frame (FIG. 1). The resultant of the movements on the two aforementioned planes corresponds to the actual shifting of said wheel 4A.

The gearshift according to the invention can be indifferently operated by means of the proper driving cable controlled by the cyclist with a handle, either by controlling (as usually done in known technique) the oscillation of the parallelogram, or by controlling the rotation of the upper body of the gearshift. By adopting this last solution—which, in practice, has proved to be simpler and more efficient—it is in fact possible to obtain exactly the same result, as far as the movements of the wheel 4A guiding the chain, since the oscillation of the parallelogram is caused by the rotation of the upper body of the gearshift.

It should be noted that, in addition to the above mentioned advantages, the invention also allows to eliminate the return spring for the parallelogram. In fact, the mere spring of the rocker arm is sufficient to stretch the chain and to position the gearshift in correspondence of the selected sprocket, thanks to the link existing between the motion of the parallelogram on the plane perpendicular to that defined by the chain, and the motion of the gearshift on the plane of the chain itself.

What is claimed is:

1. Gearshift for bicycles, of the type wherein an upper body mounted oscillating on the end of the rear fork of the bicycle, and a lower body carrying an oscillating rocker arm guiding the transmission chain, are connected by a pair of connecting rods to form therewith an articulated parallelogram, and wherein means are provided to cause rotations of said upper body in association to the oscillations of the articulated parallelogram, characterized in that said means consist of a rod, the ends of which are linked by means of ball hinges to the lower body of the gearshift and, respectively, to a fixed point on the end of said rear fork.

* * * * *